(No Model.)
C. LA DOW.
EXTENSION SUSPENSORY ROD.
No. 297,136. Patented Apr. 22, 1884.
Fig. 1.
Fig. 2.
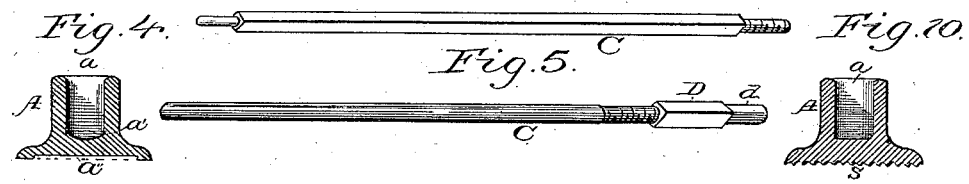
Fig. 3.
Fig. 4.
Fig. 5.
Fig. 10.
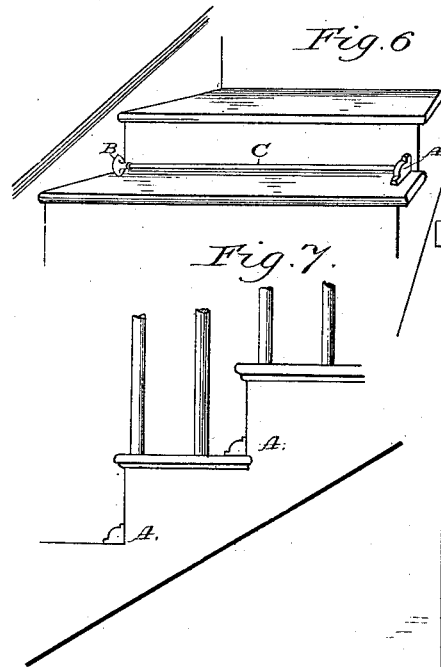
Fig. 6.
Fig. 7.
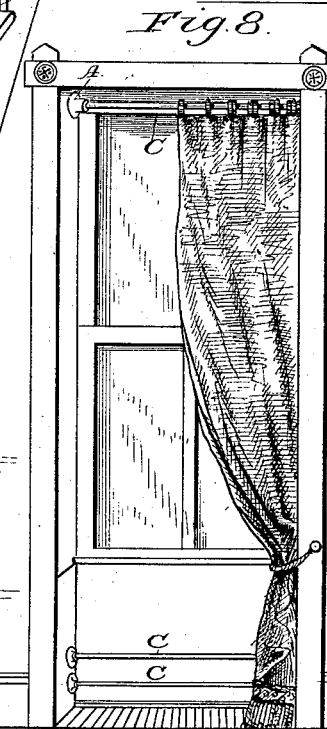
Fig. 8.
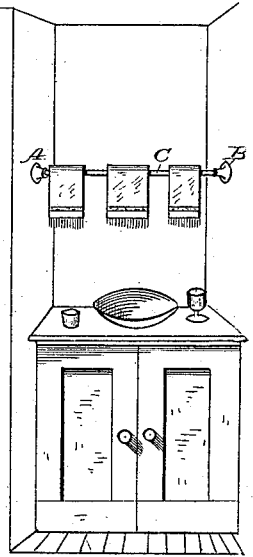
Fig. 9.
WITNESSES:
J. W. Reynolds
O. E. Duffy
INVENTOR
Charles LaDow.
BY
J. Rennie
ATTORNEY

UNITED STATES PATENT OFFICE.

CHARLES LA DOW, OF ALBANY, NEW YORK.

EXTENSION SUSPENSORY ROD.

SPECIFICATION forming part of Letters Patent No. 297,136, dated April 22, 1884.

Application filed January 23, 1884. (No model.)

*To all whom it may concern:*

Be it known that I, CHARLES LA DOW, a citizen of the United States, residing at Albany, in the county of Albany and State of New York, have invented new and useful Improvements in Extension Suspensory Rods, of which the following is a specification.

My invention relates to extension-rods to be held suspended, self-sustaining by friction between two opposing surfaces, for the purpose of sustaining clothing, samples, merchandise, or weights that may be suspended from them or be rested thereon, or for the purposes of protection, or guard-rails, or stair-carpet rods, or other purposes. These objects I attain by means of the construction shown in the accompanying drawings, which form part of this specification, and in which—

Figure 1 is a perspective of the rod C, which may be of any desired length, the socket-button A, with socket at *a* for the reception of the end of the rod C, and with the opposite end flared or flanged into a friction surface or plate. The screw-thread on the end of the rod C is fitted to the nut B, whose end is also flared into a friction-plate to correspond with the similar friction-surface on the socket-button A. *h h'* are holes in the rod for the reception of a pin that may be used in screwing or unscrewing the rod.

Fig. 2 is a vertical section of the rod-socket and nut, showing the friction-surfaces slightly concave, *a* being the socket, and *b* the opening through the nut.

Fig. 3 is a modification of the rod C, having the body of the rod squared and the ends rounded to fit the socket-button and the nut.

Fig. 4 is a vertical section of the socket-button A, showing the socket *a*, the lower part of which at *a'* (marked in dotted line) shows a rubber pad inserted, against which the end of the rod C impinges when it is inserted in the socket. It shows, also, the friction-surface of A cut out at *a''*, so a rubber disk or plate can be inserted as a friction-surface, instead of the surface of the material of which the button is made. The rubber is shown in dotted line as protruding slightly beyond the surface of the button.

Fig. 10 is a vertical section of the socket-button, showing its friction-surface at *s* fitted with points or spurs as a modification of construction.

Fig. 5 is a modification of the rod, showing its end as a screw playing in an oblong nut, which terminates in a spindle to fit a socket-button.

Fig. 6 shows the rod applied to a stair, with the nut at B, and the socket-button modified to the form of a bracket, A.

Fig. 7 is a side view, showing socket-bracket A.

Figs. 8 and 9 show the rod applied to several domestic purposes.

As shown in the drawings, the appliance consists of a stiff rod furnished at one end with a right or left screw thread and a nut whose outer or farther side is widened into a friction-plate. The opposite end of the rod is fitted with a separate piece or socket-button, whose outer surface or farther end is also flattened into a friction-surface. In this socket (*a* in the figures) the end of the rod C readily enters and turns freely. If the rod C is turned while the button A and nut B at opposite ends of the rod are held or kept from turning, the socket-button and the nut will be pushed apart from each other or drawn together by the action of the screw-thread in the nut, accordingly as the rod is turned or rotated to the right or left. If, then, the friction-surface of the button A is placed against a stationary surface, and friction-surface of the nut B is placed against an opposite stationary surface, and the rod C is turned so as to press the button and nut apart, obviously the button and nut will be pressed firmly against the stationary surfaces, and be made to cling to them by the friction of the parts, so that the rod, its button and nut, will be self-sustained between the stationary surfaces. Obviously, also, a contrary turn to the suspended rod will relieve the lateral pressure, or pressure throughout the extension of the rod, button, and nut, against the stationary surfaces between which the device has been suspended, and the rod and its parts may be readily withdrawn.

Obviously, the rod C may be made of any length to suit the purpose for which it is to be applied, and the nut may be of a greater or less depth, to give the rod greater or less extension, for the purpose of applying the rod as occasion may require between two stationary surfaces farther or less far apart; also, the rod may be supplied with screw-threads on both ends—a right screw on one end and a left screw on the other—and be supplied with two nuts to correspond, instead of one nut and one button, and thus the parts will have greater extension, and may be more speedily set in place. The rod may be made square, as shown in Fig. 3, with a screw at one end and at the other a spindle to play in the button. Obviously, the parts may be of different degrees of thickness, according to the service to be required of them, and one end of the rod may be hollowed to play on a pivot attached to a friction-plate, instead of playing into a socket-button. A further obvious modification is to supply the nut B with a spindle, Fig. 5, $d$ and D, instead of expanding it into a friction-plate, and supply the rod and nut thus constructed with two socket-buttons, as described and shown at A, Fig. 2, one button for the rod to play in and one for the spindle on the nut to play in.

The friction-surfaces of the buttons and nuts may be furnished with points or spurs, Fig. 10, $s$, to increase their friction and suspensory power when made to bite into the opposing surfaces, against which they are pressed by the action of the screw-rod C; or they may be furnished with rubber cushions, Fig. 4, set in the friction-surfaces, as at $a''$, so as not to mar or dent the surfaces against which they are impinged, and the socket may be supplied with a rubber cushion, Fig. 4, $a'$, to increase the stability of the parts when in place in service. Obviously, the parts may be of wood, or of wood with metal bearings.

The object of my invention is to furnish a means by which an extension-rod may be readily adjusted in a suitable place for domestic, business, or ornamental uses, and as readily moved and readjusted. Fig. 9 shows the rod in use as a towel-rack, or for other suspensory purposes, and as such it can be set at any or shifted to any desired elevation in a suitable space between a chimney or closet and the side wall of a room. As in Fig. 8, it may be adjusted between window-casings for suspending window-curtains or lambrequins thereon; between door-casings for suspending therefrom a portière, so that the dust will not gather on the top folds of the curtain material, to its damage, as is the case when the material is suspended from a pole and brackets without or on the outside of the window-casing. It may also be used as a foot-guard or foot-rest in deep windows, as shown in Fig. 8. It may be used for show-case or show-window racks. It may be used in the lower part of windows within the casings or without the same, or extending from bricks to bricks across the window as a protection or guard. The rods may be also used for stair-carpet rails, in which case, if the stairs are constructed with side risers, the rods may be adjusted, in the ordinary way, between the wall and the side riser. If the stairs are open at the side, as in Fig. 7, a modification of the socket-button is used, as shown in Figs. 7 and 8, A. The button is made in the shape of a bracket to be screwed to the stair, as shown, and the extension-rod is adjusted between this bracket and the wall, the screw end of the rod and the nut being at B, Fig. 6, and held by friction against the side wall of the stairs. Obviously, the rod may be applied to many other useful and ornamental purposes that readily suggest themselves. Ordinarily the rod may be adjusted and screwed or unscrewed by hand; but the rod may be furnished with holes, as Fig. 1, $h$ and $h'$, into which a pin may be inserted and used in turning the rod under circumstances where the hand alone or a wrench cannot easily be applied.

The object of the construction shown in Fig. 5 is to supply a nut that may be turned with a wrench, and also to provide a means for increasing the extension of the rod and the force with which the instrument can be extended and pressed against the opposing surfaces between which it is to be self-suspended. The rods are readily suspended between two opposing surfaces without doing damage to said surfaces by the friction and pressure of the parts. They are durable, easily constructed, and ornamental.

The method of construction and of operation and the advantages of my invention will be obvious to those skilled in the art from the foregoing description without further explanation.

I claim as of my own invention—

1. The combination of the extension-rod with its socket-button and nut, substantially as described, for maintaining the same self-sustained by friction of the parts between two opposing surfaces for suspensory or other purposes.

2. The combination of the extension-rod with its socket-button and nut and rubber pads, substantially as described.

CHARLES LA DOW.

Witnesses:
B. I. STANTON,
FREDK. HARRIS.